Nov. 22, 1966 K. W. McGLASHAN 3,287,605

DEFLECTION YOKE ASSEMBLY WITH TERMINAL HOUSING

Filed Oct. 5, 1964 2 Sheets-Sheet 1

INVENTOR
KENNETH W. McGLASHAN
BY
Bair, Freeman & Molinare
Attys.

DEFLECTION YOKE ASSEMBLY WITH TERMINAL HOUSING

Filed Oct. 5, 1964

INVENTOR
KENNETH W. McGLASHAN

BY

Bair, Freeman & Molinare
Attys.

United States Patent Office 3,287,605
Patented Nov. 22, 1966

3,287,605
DEFLECTION YOKE ASSEMBLY WITH TERMINAL HOUSING

Kenneth W. McGlashan, Burlington, Iowa, assignor to Advance Ross Electronics Corporation, a corporation of Illinois Filed Oct. 5, 1964, Ser. No. 401,586
7 Claims. (Cl. 317—101)

This invention relates generally to deflection yokes and more particularly to a new and improved deflection yoke assembly of the type having television uses, including black and white, and color, as well as various other applications.

Because of the comparatively large size and cost of a deflection yoke, relative to the other components of a television set, for example, workers in the art have been continually seeking new and improved approaches to deflection yoke construction and manufacture. One yoke component which particularly has needed improvement is the terminal board or housing conventionally provided at the rear portion of the yoke assembly for enabling electrical connections to be made between the yoke windings and the leads of the external circuitry. Very often, the nature of the terminal board requires time consuming, costly and sometimes erroneous operations in connecting and disconnecting the leads to the terminals.

An additional problem which has existed in prior art deflection yokes relates to the conflicting requirements for correction of pincushion distortion and convergence errors of the television picture. Those skilled in the art appreciate that the geometry of the normal cathode ray tube is such that pincushion distortion is induced in the picture. It is a common expedient to shape the deflection yoke magnetic field so as to correct for this pincushion effect, but this has resulted in the introduction of convergence errors due to unequal deflection of the beams.

Accordingly, it is a general object of this invention to provide a new and improved deflection yoke construction which successfully overcomes the above-noted problems of prior art deflection yokes.

It is another object of this invention to provide such a deflection yoke construction having a novel terminal housing comprising solder well pin terminals aligned thereon so as to enable dip soldering of the terminals and the component leads to be directly and simply inserted into the pin cavities before dip soldering.

It is still another object of this invention to provide a novel deflection yoke, as above, having a substantially rectangular terminal housing with linearly arrayed terminal pins thereon to facilitate multiple dip soldering thereof and further having separating walls or ribs of insulating material between adjacent terminal pins to improve the high voltage breakdown characteristics of the terminal housing.

It is a further object of this invention to provide a new and improved deflection yoke terminal housing having a base member and a cover wherein said base member and cover are each formed with an unsymmetrical configuration to prevent misalignment therebetween and to insure proper placement of the cover on the base member so that the terminal identifying numbers on the cover are properly associated with their respective terminal pins on the base member and the electrical connections between the external leads and yoke components are correctly made.

It is a still further object of this invention to provide a novel and highly advantageous deflection yoke construction comprising a terminal housing cover adapted to snap fit over the terminal housing base member and further having an integral liner molded therein for enabling the rear portion of the yoke to be supported by the neck portion of the cathode ray tube, if desired, and for keeping the yoke essentially concentric with the neck of the tube.

It is still another object of this invention to provide a novel deflection yoke having improved means for reducing pincushion distortion while providing a raster having good convergence properties.

It is still another object of this invention to provide such a deflection yoke which uniquely comprises an insulating spacer on the liner to maintain a gap between a pair of adjacent windings or coils wherein said spacer has portions of different width throughout its length to achieve a pincushion correction characteristic.

It is a further object of this invention to provide a new deflection yoke, as above, which is characterized by its efficiency and economy of construction as well as by its substantially improved operation.

The novel features which are characteristic of the invention are set forth with particularity in the appended claims. The invention itself, however, both as to its organization and method of operation, together with further objects and advantages thereof, will best be understood by reference to the following description taken in conjunction with the accompanying drawing in which:

Figure 1:
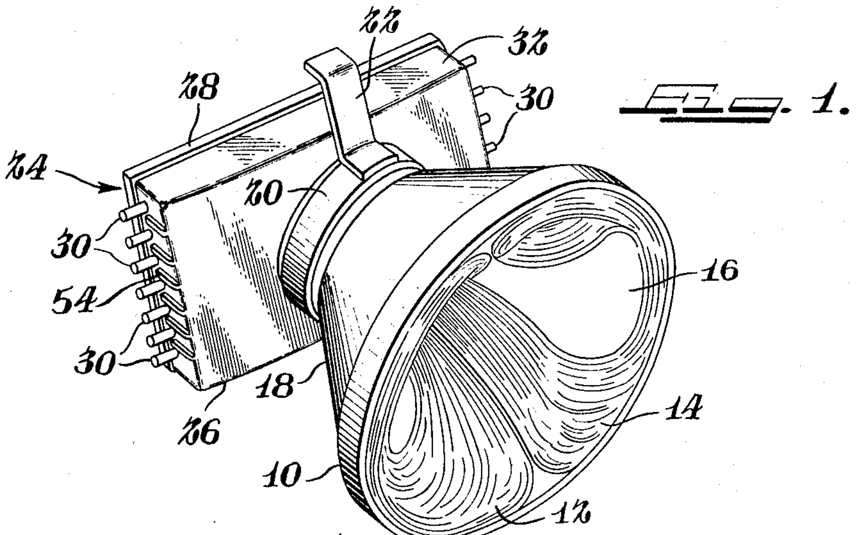
FIGURE 1 is a perspective view of one illustrative embodiment of deflection yoke constructed in accordance with the present invention.

Referring now to the drawings, and more particularly to FIGURE 1 thereof, there is shown an illustrative deflection yoke assembly embodying the novel features of the present invention. It will be appreciated by those skilled in the art that the illustrative deflection yoke 10 comprises a number of conventional components, such as a pair of inner coils or windings 12 and 14 positioned upon and supported by a liner 16 advantageously formed of electrical insulation material such as plastic. A pair of outer coils or windings (not shown) is positioned on the other side of the insulating liner 16 and is oriented at a 90° displacement with respect to the inner coils so as to provide for the horizontal and vertical deflection of the electron beam within the cathode ray tube. A suitable magnetic core 18, of ferrite segments or the like, is positioned around the outer coils or windings on the outside of the deflection yoke and advantageously the core 18 is held securely in place by means of suitable clamping or mounting rings, such as the rings 20, shown attached to the bracket 22. In accordance with conventional prior art practices, the deflection yoke is made substantially tubular in form so as to permit the neck of a cathode ray tube to be inserted therethrough and thereby permit the yoke coils or windings to be in beam deflection relationship with the cathode ray tube.

A terminal housing for enabling the necessary electrical connections to be made between the deflection coils and the remaining components of the deflection circuitry is provided at the narrow end of the deflection yoke, as illustrated in FIGURE 1 of the drawing. As there shown, the terminal housing 24 advantageously is made substantially rectangular in shape with portions thereof extending radially outward of the deflection yoke and substantially transverse to its longitudinal axis. Advantageously, the terminal housing base portion 26 is prevented from angular or axial movement with respect to the remainder of the yoke by means of suitable projections, bands, cements, and the like, such as are known to those skilled in the art.

In accordance with a novel feature of the present invention, the terminal housing 24 comprises a base portion 26 and a cover portion 28. The base portion 26 is formed with a plurality of side walls 32 so as to define an enclosure therewithin. As particularly illustrated in FIGURES 1, 3 and 4 of the drawing, it is a feature of the present invention that at least some of the side walls 32 are made substantially planar, rather than arcuate, to enable an array of terminal pins 30 to be linearly aligned thereon. Advantageously, in accordance with one particularly useful embodiment of the invention, the terminal pins 30 are of the solder well type having a hollow cavity 48, an aperture 50 at its outer end, and an aperture 52 at its inner end. It will be appreciated by those skilled in the art that such solder well terminal pins are adapted to receive the electrical wires to be connected within the interior aperture 52 and to receive solder for completing the connections within the exterior aperture 50. Due to the linear arrangement of the terminal pin array on the planar side wall 32 of the terminal housing, an entire array of such terminal pins may be dip soldered to permit a relatively easy and low cost manufacturing step. Such multiple dip soldering of the terminal pins on the terminal housing provides considerable advantage over the more expensive and time consuming operations required for circular terminal housings of the type utilized in prior art deflection yokes.

Those skilled in the art further will appreciate that in certain types of cathode ray tubes, as for example a 90° color television deflection yoke, certain space requirements may make it advantageous to dispose the terminal pins 30 in a plane substantially transverse to the longitudinal axis of the yoke. This is particularly illustrated in FIGURE 4 of the drawing which shows one highly advantageous embodiment of the invention wherein the terminal pins 30 are positioned at a slight angle, such as ten degrees, with respect to the plane of the terminal housing. It can be understood that this slight angle facilities the easy insertion of the component leads into the pin cavities through the interior aperture 52.

Figure 2:
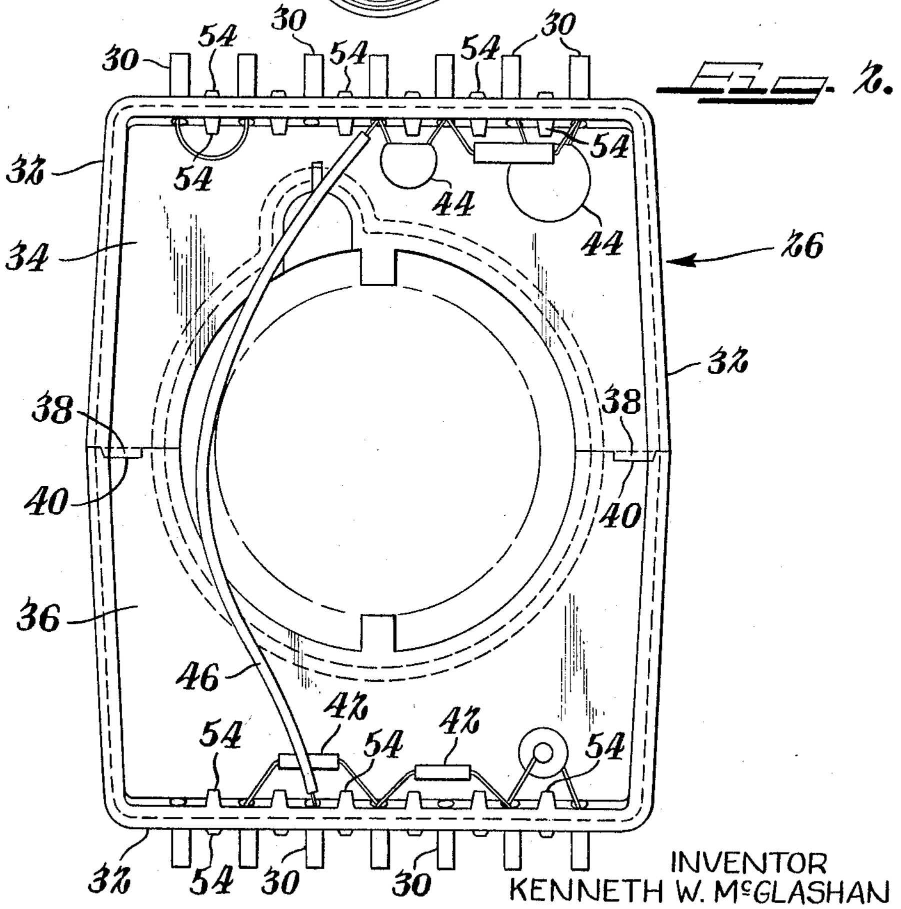
FIGURE 2 is a plan view of the terminal housing base member utilized in the illustrative embodiment of FIGURE 1.

FIGURE 2 of the drawing illustrates a number of such electrical components such as the resistors 42 and the capacitors 44, assembled in position within the terminal housing enclosure and having their electrical leads placed within the terminal pin cavities in the manner described above. Also, suitable conductors such as conductor 46 may be connected between the terminal pin cavities 30. It further has proved advantageous, as particularly illustrated in FIGURE 2, to provide insulating walls or ribs 54 between adjacent terminal pins 30 to enhance the high voltage breakdown characteristics of the terminal connections in the housing.

Figure 5:
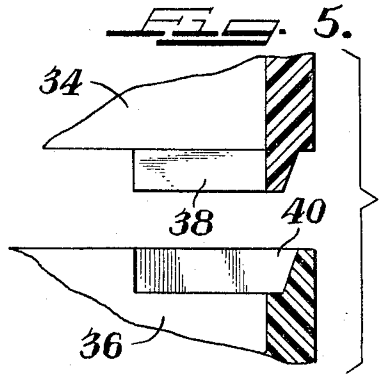
FIGURE 5 is a partial view of the projection and mating pocket features of the terminal housing.

Although the base and cover portions of the terminals housing 24 may be made in any desirable manner and of any suitable insulating material, it is a preferred embodiment of this invention to mold these terminal portions of a lightweight plastic material. Advantageously, the base portion 26 may be molded in two segments 34 and 36 which are adapted to be mated with each other around the neck 56 of the cathode ray tube. As particularly shown in FIGURE 5 of the drawing, one of the base segments 34 may be provided with a pair of integral projections 38 adapted to mate with the corresponding recesses or pockets 40 molded into the segment 36. It will be appreciated by those skilled in the art that the provision of the mating projections 38 and recesses 40 on the housing segments prevent lateral movement therebetween when the housing is assembled on the neck of the cathode ray tube.

It also is a feature of this particular illustrative embodiment of the invention that one of the housing segments be made of different dimensions than the other housing segment to aid in the proper connections of the electrical leads to the terminal pins. Thus, in the illustrative example of FIGURES 2 and 3, the housing segment 36 is of a longer extent from its junction with the other housing segment 34 to the terminal pins, than the extent of the segment 34 from the junction to its terminal pins. The purpose of making the base portion 32 of the terminal housing unsymmetrical in this fashion is to insure that the cover portion 28 can only be positioned upon the base portion in a desired predetermined manner. Towards this end, the cover portion 28 is molded so as to also be unsymmetrical in a corresponding fashion to the base portion 32, with the result that the cover portion 28 can be fitted upon the base portion 32 in one direction only and will not fit when rotated 180° from the correct fitting position. By keying the cover portion 28 to fit upon the base portion 32 of the terminal housing in only a desired predetermined fashion, erroneous assembly of the terminal housing and erroneous connection of the leads to the terminal pins can be avoided. Towards this end, the cover portion 28 may have identification indicia, such as numerals, applied thereto for identification and association of each individual terminal pin. In the illustrative example of FIGURE 1, for example, the cover 28 may have the numerals 1 to 7 applied to one end thereof in association with the respective terminal pins while the other end of the cover may have the identification numerals 8 through 14 applied thereto in association with the terminal pins at the other end of the base portion 26. During the assembly of the deflection yoke, the operator may have instructions to connect certain components and electrical leads to terminal pins of desired numerical designation. If it were possible to erroneously position the cover 28 on the base 26, this could result in erroneous electrical connections being made. However, since the cover is uniquely keyed to the base, and can only be positioned in one way thereon, the possibility of such erroneous electrical connections is totally eliminated.

While it is contemplated that the cover 28 may be positioned upon the base 26 in any suitable manner, it is a feature of the particular embodiment illustrated in the drawing, that the cover may be positioned upon the base by means of a snap fit which takes advantage of the resilient properties of the plastic material from which the terminal housing is formed. Towards this end, the dependent flange wall of the cover 28 may be widened at its lower edge to provide a bead 57 adapted to cooperate with a widened bead 58 around the peripheral edge of the base portion 26. Advantageously, the beads 57 and 58 are provided with arcuate surfaces to facilitate the sliding action of the beads when the cover 28 is positioned upon the base 26 to provide a snap fit. Due to the resilience of the plastic material utilized in forming the cover and base portions of the terminal housings, the two portions will be interlocked and securely held to each other after the snap fit is made.

Figure 3:
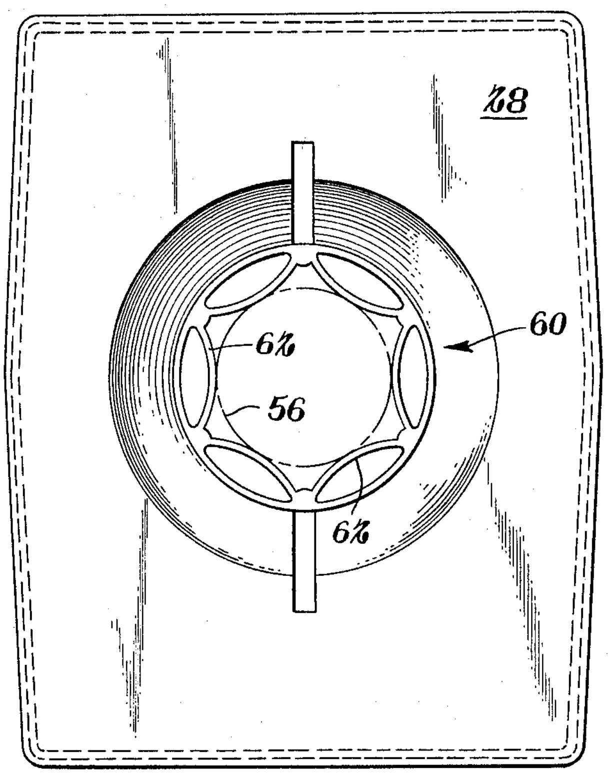
FIGURE 3 is a plan view of the terminal housing cover.
Figure 4:
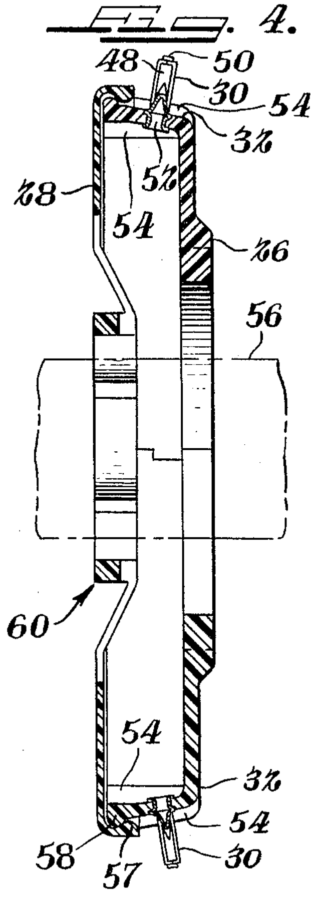
FIGURE 4 is a cross-sectional view of the terminal housing showing the manner in which its rear portion may be mounted upon and supported by the neck of the cathode ray tube.

A still further feature of this particular illustrative embodiment of the invention is particularly disclosed in FIGURES 3 and 4 of the drawing. Advantageously, the cover portion 28 of the terminal housing may be provided with a tube support liner 60 at its central portion for receiving the neck 56 of the cathode ray tube. The centering of the terminal housing with respect to the cathode ray tube may be facilitated by the provision of the arcuate ribs 62 which are integrally molded of the resilient plastic material forming the cover so that, if desired, the terminal housing cover 28 at the rear portion of the yoke may be firmly, yet resiliently, supported by the neck 56 of the cathode ray tube.

Figure 6:
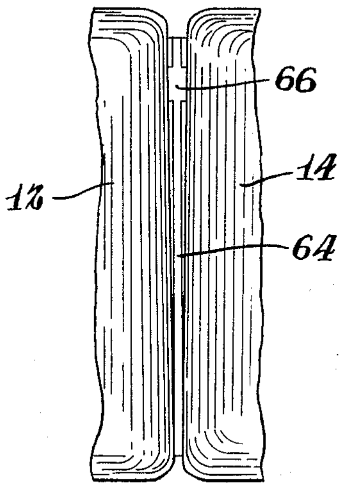
FIGURE 6 illustrates one embodiment of variable width insulating spacer on the liner for maintaining a gap between adjacent coils to provide pincushion correction.

In accordance with a still further feature of the present invention, as illustrated by the particular embodiment shown in FIGURE 6 of the drawing, unique means are provided in the deflection yoke for enabling the cathode ray tube to provide a raster having good convergence properties in conjunction with a minimum of pincushion distortion. Such distortion problems are particularly troublesome in connection with color television cathode ray tubes and yokes. Those skilled in the art will appreciate that if the deflection yoke field is shaped to correct for pincushion distortion, convergence errors will be introduced due to the unequal deflection of the individual beams within the color television tube.

In accordance with a unique feature of the present invention, the assembly diverse requirements for pincushion correction and convergence error minimization are met by the novel provision of a variable width gap between adjacent windings, or coils of the deflection yoke. In particular, with reference to FIGURE 6, the entry end of the yoke shown at the upper portion of the figure is provided with a wider gap between the deflection windings 12 and 14 than is provided at the exit end of the yoke, shown at the lower portion of FIGURE 6.

Those skilled in the art will appreciate that this variable width gap between the deflection windings 12 and 14 may be achieved in any one of several possible fashions, all intended to be within the scope of the present invention. In the particular illustrative embodiment of FIGURE 6, the variable width gap is provided by the use of an elongated rib 64 which extends the length of the yoke liner 16 from the entry end to the flared exit end thereof. At that portion of the elongated rib 64 adjacent the entry end of the yoke, the rib 64 is widened to provide a spacer 66 of greater width than the remaining portions of the rib 64. Manifestly, this serves to provide a greater spacing between the deflection windings 12 and 14 at the entry portion of the yoke and at the exit portion of the yoke.

Those skilled in the art will appreciate that this desirable variable width spacing also may be achieved by means of a tapered elongated rib 64 which tapers from its wide portion at the entry end of the yoke to its narrow portion at the exit end of the yoke. Preferably, the variable width rib 64 may be integrally molded with the liner 16 or may be separately formed and attached thereto, as desired.

While there has been shown and described a specific embodiment of the present invention, it will, of course, be understood that various modificatitons and alternative constructions may be made without departing from the true spirit and scope of the invention. Therefore, it is intended by the appended claims to cover all such modifications and alternative constructions as fall within their true spirit and scope.

What is claimed as the invention is:

1. An improved deflection yoke assembly with terminal housing comprising the combination of a supporting liner formed of electrical insulation material and shaped to fit around the neck of a cathode ray tube, reflection windings positioned upon and supported by said liner, and a terminal housing at one end of said liner, said terminal housing comprising a base member having a plurality of side walls defining an enclosure therewithin and a mating cover member shaped to fit over and close said enclosure, an array of terminal pins aligned on at least one side wall of said base member, said terminal pins enabling electrical connections to be made between said deflection windings and other electrical components of the deflection circuitry, the alignment of said terminal pins enabling said electrical connections to be secured by dip soldering of the terminal array, and means on said terminal housing base and cover members for permitting the mating thereof in a predetermined manner only to enable said terminal pins to properly be identified and the correct electrical connections made thereto.

2. An improved deflection yoke assembly with terminal housing in accordance with claim 1 further comprising separating walls of insulating material extending between adjacent ones of said terminal pins to enhance the voltage breakdown characteristics of said terminal housing.

3. An improved deflection yoke assembly with terminal housing comprising the combination of a supporting liner formed of electrical insulation material and having a substantially tubular portion shaped to fit around the neck of a cathode ray tube, deflection windings positioned upon and supported by said liner, and a terminal housing at one end of said liner, said terminal housing having a substantially rectangular configuration with the axes thereof being perpendicular to the axis of the tubular portion of said liner, said terminal housing comprising a base member having a plurality of side walls defining an enclosure therewithin a mating cover member shaped to fit over and close said enclosure, an array of terminal pins aligned on at least one side wall of said base member, said terminal pins enabling electrical connections to be made between said deflection windings and other electrical components of the deflection circuitry, the alignment of said terminal pins enabling said electrical connections to be secured by dip soldering of the terminal array, and means on said terminal housing base and cover members for permitting the mating thereof in a predetermined manner only to enable said terminal pins to properly be identified and the correct electrical connections made thereto.

4. An improved deflection yoke assembly with terminal housing comprising the combination of a supporting liner formed of electrical insulation material and having a substantially tubular portion shaped to fit around the neck of a cathode ray tube, deflection windings positioned upon and supported by said liner, and a terminal housing at one end of said liner, said terminal housing having a substantially rectangular configuration with the axes thereof being perpendicular to the axis of the tubular portion of said liner, said terminal housing comprising a base member having a plurality of side walls defining an enclosure therewithin and a mating cover member shaped to fit over and close said enclosure, an array of terminal pins aligned on at least one side wall of said base member, said terminal pins enabling electrical connections to be made between said deflection windings and other electrical components of the deflection circuitry, the alignment of said terminal pins enabling said electrical connections to be secured by dip soldering of the terminal array, and cooperating projection and recess means on said terminal housing base and cover members for permitting the mating thereof in a snap-fit manner and for holding said members snugly engaged with each other by the resilient action of said means.

5. An improved deflection yoke assembly with terminal housing comprising the combination of a supporting liner formed of electrical insulation material and shaped to fit around the neck of a cathode ray tube, deflection windings positioned upon and supported by said liner, and a terminal housing at one end of said liner, said terminal housing comprising a base member having a plurality of side walls defining an enclosure therewithin and a mating cover member shaped to fit over and close said enclosure, an array of terminal pins aligned on at lease one side wall of said base member, said terminal pins enabling electrical connections to be made between said deflection windings and other electrical components of the deflection circuitry, the alignment of said terminal pins enabling said electrical connections to be secured by dip soldering of the terminal array, and means on said cover member for concentrically positioning the neck of the cathode ray tube and said deflection yoke relative to each other.

6. An improved deflection yoke assembly with terminal housing in accordance with claim 5 wherein said lastnamed means comprises a plurality of resilient, arcuate ribs integrally formed on said cover members.

7. An improved deflection yoke with terminal housing comprising the combination of a supporting liner formed of electrical insulation material and having a substantially tubular portion shaped to fit around the neck of a cathode ray tube, a pair of deflection windings positioned upon and supported by said liner, spacer means between said pair of deflection windings, said spacer means being formed of electrical insulation material, at least one portion of said spacer means being of a greater width than the other portions of said spacer means for maintaining a gap of non-uniform width between said pair of deflection windings, and a terminal housing at one end of said liner, said terminal housing having a substantially rectangular configuration with the axes thereof being perpendicular to the axis of the tubular portion of said liner, said terminal housing comprising a base member having a plurality of side walls defining an enclosure therewithin and a mating cover member shaped to fit over and close said enclosure, an array of terminal pins aligned on at least one side wall of said base member, said terminal pins enabling electrical connections to be made between said deflection windings and other electrical components of the deflection circuitry, the alignment of said terminal pins enabling said electrical connections to be secured by dip soldering of the terminals, and means on said terminal housing base and cover members for permitting the mating thereof in a predetermined manner only to enable said terminal pins to properly be identified and the correct electrical connections made thereto.

References Cited by the Examiner

UNITED STATES PATENTS

| | | | |
|---|---|---|---|
| 2,796,601 | 6/1957 | Gustafson et al. | 317—101 X |
| 3,104,282 | 9/1963 | Horn et al. | 317—101 X |
| 3,140,432 | 7/1964 | Imanaka | 317—200 |

FOREIGN PATENTS

| | | |
|---|---|---|
| Ad. 55,170 | 10/1951 | France. |

ROBERT K. SCHAEFER, *Primary Examiner.*

W. C. GARVERT, *Assistant Examiner.*